Figure 1:
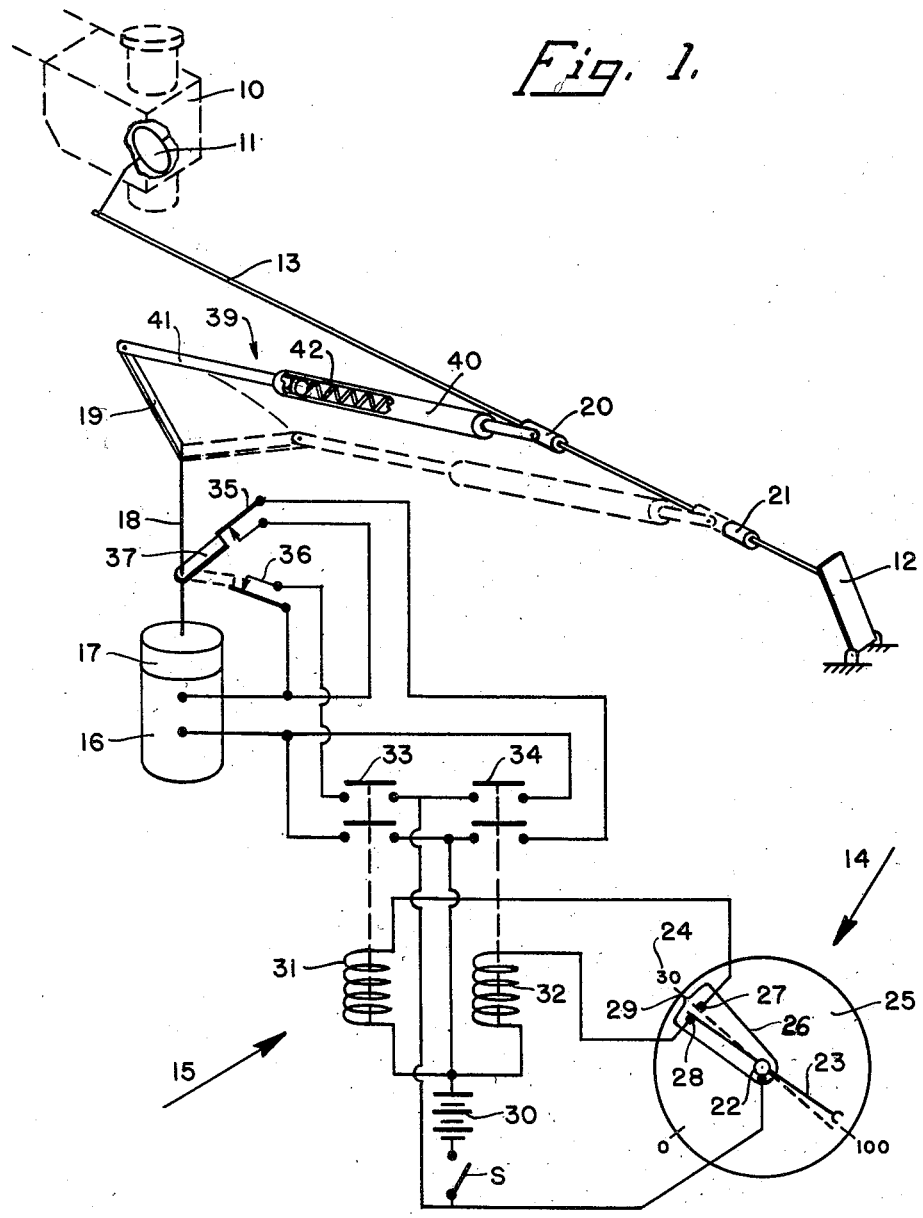

Feb. 11, 1958 R. L. TREHARNE 2,822,881
SPEED SELECTOR

Filed Aug. 21, 1953 2 Sheets-Sheet 1

INVENTOR.
ROLAND LLOYD TREHARNE
BY
G. D. O'Brien
E. C. Walsh
ATTORNEYS

INVENTOR.
ROLAND LLOYD TREHARNE

United States Patent Office 2,822,881
Patented Feb. 11, 1958

2,822,881
SPEED SELECTOR
Roland L. Treharne, Hawthorne, Nev.
Application August 21, 1953, Serial No. 375,840
2 Claims. (Cl. 180—82.1)
(Granted under Title 35, U. S. Code (1952), sec. 266)

The invention described herein may be manufactured and used by or for the Government of the United States of America for governmental purposes without the payment of any royalties thereon or therefor.

The present invention relates to speed governors for motor vehicles and has for its primary object the provision of means for moving the accelerator pedal of a motor vehicle in a direction to effect deceleration of the vehicle when the speed thereof exceeds a preselected value.

Heretofore, many and various speed limiting devices for automobiles have been evolved. These prior governing arrangements generally utilized the engine r. p. m. as the speed indicative input to the governing apparatus or employed positive limit stops on the throttle mechanism whereby to limit accelerator depression. Speed governing systems which utilize engine r. p. m. cannot be satisfactorily employed with the present day automobiles which include fluid drives or torque converters between the engine and drive shaft owing to the fact that in such arrangements the engine speed does not provide a true indication of linear vehicle speed. Thus, for a given engine r. p. m., the speed of a vehicle may vary over a large range depending upon the load, the latter varying with the grade of the road, for example. Positive limit stops in the throttle systems are likewise unsatisfactory as speed governors in automotive vehicles for the reason that for a given throttle or accelerator position vehicle speed is dependent on engine load. Further, such positive stops and many of the other previous speed governing arrangements did not permit the operator to momentarily exceed the preselected maximum speed, as, for example, in the event of an emergency or where it was desired to pass another vehicle.

The present invention avoids the disadvantages associated with these prior art speed limiting devices by providing a governing apparatus for automobiles which is actuated by the speed of the vehicle itself rather than that of any of its components and which permits unrestricted manual speed control below a preselected maximum value and speeds in excess of such maximum in the event of an emergency or where it is necessary to pass another vehicle.

In accordance with the foregoing, it is an object of the present invention to provide a speed limiting device for automotive vehicles.

Another object of the invention is to provide a speed governing device for automotive vehicles which is responsive to the actual speed of the vehicle rather than to the speed of any of its components.

A further object is the provision of speed limiting means for an automotive vehicle which permits unrestricted manual speed control below a preselected maximum speed and speeds in excess of the maximum in the event of an emergency or when it is necessary to pass another vehicle.

Another object is to provide speed control for automotive vehicles which, when a preselected maximum speed is exceeded, acts to cause movement of the accelerator pedal of the vehicle in a direction to retard the speed of the vehicle and which speed limiting means is spring loaded whereby increased pressure on the accelerator will render the governing apparatus inoperable to allow speeds in excess of the preselected maximum speed as in the event of an emergency.

Figure 2:
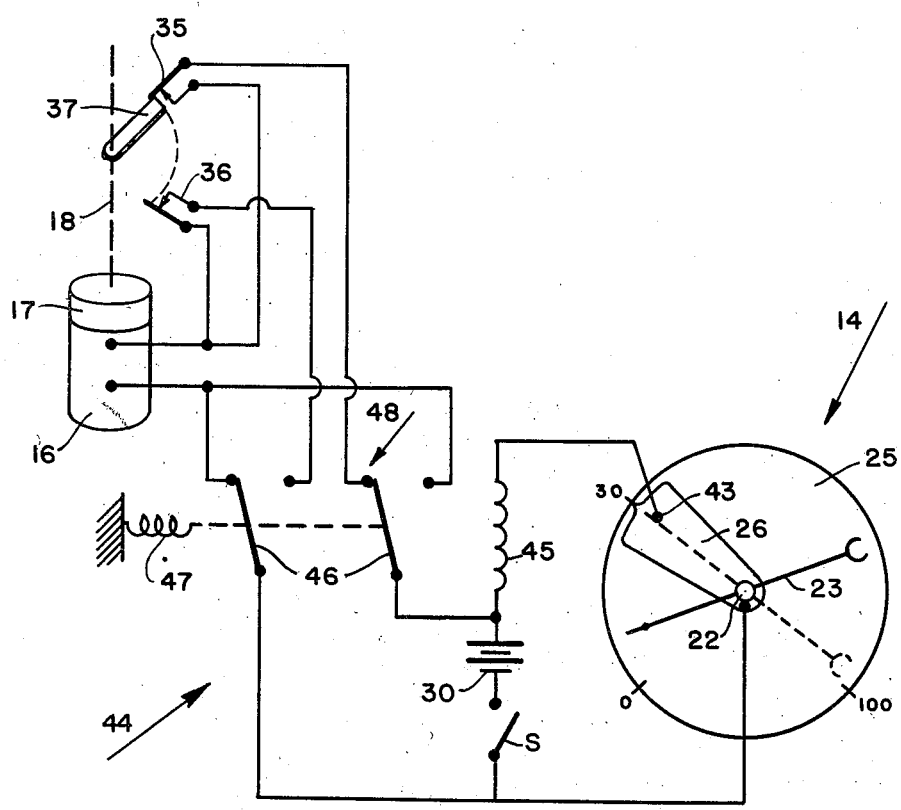

Other objects and many of the attendant advantages of the present invention will become apparent as the same becomes better understood from the following detailed description had in conjunction with the annexed drawings wherein:

Fig. 1 is a diagrammatic view of the speed limiting arrangement of the present invention; and Fig. 2 illustrates in modified form the speed responsive element of the speed limiting device of the present invention.

Referring now to the drawings, and more particularly to Fig. 1 there is illustrated at 10 a conventional automobile carburetor having a butterfly valve 11 therein which is, in the well known manner, operated by depression of the accelerator pedal 12, acting through connecting link 13, whereby to present a greater or lesser restriction in the air intake passage of carburetor 10, and thus regulate engine speed. The speed limiting arrangement of the present invention comprises broadly a vehicle speed responsive element 14 which acts to energize a relay 15 in a manner to cause rotation of a reversible motor 16 and gear reduction unit 17 in one direction or the other depending upon whether the vehicle speed is above or below the preselected value. Gear reduction unit 17, through a drive shaft 18, operates a pivoted arm 19 linked to a movable stop member 20, slidably mounted on link 13, whereby to cause movement of stop member 20 from and into engagement with an abutment 21 rigidly fixed on link 13. Thus, at vehicle speeds below the preselected maximum value, stop member 20 will be retained in spaced relation to abutment 21, thereby permitting unrestricted accelerator pedal depression, while at vehicle speeds above the preselected maximum value, stop member 20 will be moved into contact with abutment 21 thereby moving the accelerator pedal back against the operator's foot and in a direction to decelerate the vehicle. Referring now in greater detail to the above mentioned components, speed responsive element 14, which imay be the conventional speedometer of the automotive vehicle or some other separate unit, comprises, in the modification of Fig. 1, a rotatable shaft 22, having fixed thereto a contact arm 23, the angular displacement of which, with respect to a fixed reference, is, through conventional means, not shown, caused to be proportional to the linear speed of the vehicle. A set of indicia 24 may be provided around the periphery of shaft supporting member 25 for indicating the vehicle speeds corresponding to given angular positions of shaft 22. Rotatably mounted on shaft 22 and insulated therefrom is a contact support plate 26 carrying a pair of spaced contacts 27 and 28 between which contact arm 23 is disposed. Contact support plate 26 has provided thereon a pointer 29, located on a median line between contacts 27 and 28, and is adapted to be manually pivoted about shaft 22 and disposed with its pointer 29 in alignment with a selected one of the speed indicia 24 whereby to set the desired maximum speed of the vehicle. In electrical circuit with contact 27 and one terminal of battery 30 is a first coil 31 of relay 15 and in electrical circuit with contact 28 and said one terminal of battery 30 is a second coil 32 of relay 15, the other terminal of battery 30 being electrically connected, through the vehicle ignition switch S, to contact arm 23 as by a slip-ring connection between shaft 22 and the battery conductor, whereby engagement of arm 23 with one or the other of contacts 27 or 28 will cause energization of the respective one of coils 31, 32. Relay 15 includes a pair of spring opened, double pole switches 33 and 34 which are moved to closed position by energizing of coils 31 and 32, respectively. Motor 16 has its terminals connected to the contacts of switches 33 and 34, through a pair of limit switches 35 and 36 in the manner shown, the arrangement being such that closing of switch 33 will cause motor 16 to rotate in one direction and closing of switch 34 will cause the motor to rotate in the opposite direction. Mounted on a shaft 18, drivably connecting arm 19 and the drive shaft of the reduction unit 17, is a limit switch operating arm 37 which acts to open one or the other of limit switches 35 and 36, and thereby open the energizing circuit of motor 16, after a predetermined angular displacement of shaft 18. Operatively connecting stop 20 and arm 19 is a spring loaded connecting link 39 comprising a tubular member 40 pivotally secured at one end to movable stop 20 and having slidably positioned therein a plunger member 41 pivotally secured at one end to arm 19. A spring 42 is positioned within member 40 and normally keeps plunger member 41 in its extended position.

From the above description the operation of the present invention will be apparent. Thus, the solid line positions of the parts shown in Fig. 1 represents the positions of those parts while the vehicle is stationary. Upon operation of the vehicle, the operator manually adjusts contact plate 26 so that its pointer 29 is aligned with a selected one of the indicia 24 indicating the desired maximum speed to be travelled. Such adjustment of contact plate 26 will carry with it contact arm 23, which, because of the conventional biasing spring, not shown, will remain in engagement with contact 28. Upon energizing of the circuit by closing of the ignition switch S, relay 32 will be energized and switch 34 will be closed. However, because, upon the previous deceleration of the vehicle, movable stop 20 will have been shifted to the retracted (solid line) position shown and limit switch 35 will have been opened by operating arm 37, motor 16 will remain unenergized. Owing to the slidable engagement of stop 20 on link 13 the operator may move accelerator pedal 12 to control the speed of the car below the maximum speed as desired. At all speeds below the maximum speed set by contact plate 26, contact arm 23 will remain in engagement with contact 28 and the parts will remain in the solid line position of Fig. 1. Upon depressing the accelerator pedal 12 to a position whereat the speed of the vehicle exceeds the preselected maximum speed, however, contact arm 23 will move out of engagement with contact 28 and into engagement with contact 27 thereby causing opening of switch 34, energization of coil 31, closing of switch 33, and rotation of motor 16 in a direction to move arm 19, link 39, and stop member 20 to the dotted line position. Upon moving to the dotted line positions, stop 20 will move into engagement with, and exert a force on abutmentment 21 thereby forcing the accelerator pedal 12 back against the operator's foot whereby to operate butterfly valve 11 to its closed position and cause slowing down of the vehicle. Arm 27 will act to open limit switch 36, and deenergize motor 16, when the accelerator pedal is moved to its completely retracted position or to a position determined by the location of abutment 21 which may be made adjustable on link 13. Upon deceleration of the vehicle below the preset maximum speed, contact arm 23 will again move into engagement with contact 28, thereby causing reversed rotation of motor 16 and movement of stop member 20 back to its retracted solid line position, thus permitting the operator to again control the speed of the vehicle without restriction. Should the operator, during a period when stop 20 is in engagement with abutment 21, find it necessary to accelerate the vehicle, as in an emergency, for example, he need only exert sufficient additional pressure on accelerator pedal 12 to overcome the resistance of spring 42, which may have as high a spring constant as desired, whereby to telescope member 41 into member 40 thus permitting movement of link 13, opening of the butterfly valve 11, and acceleration of the automobile.

In the modification of Fig. 2, only one adjustable contact 43 is provided on the speed responsive element 14 and the contact arm 23 is free to move in the area between the contact 43 and the zero speed position. Relay 44, which corresponds to relay 15 in the modification of Fig. 1, comprises in this instance only one coil 45 for moving contactor arms 46 of the switch 48, comprising relay 44, against the resistance of spring 47, normally biasing contactor arms 46 to a position wherein motor 16 is energized to move stop 20 to its retracted position. In this modification, at all speeds below the preselected maximum the contactor arms 46 will remain in engagement with the contacts which effect retraction of stop 20 and upon exceeding the preselected maximum speed, coil 45 will become energized by movement of arm 23 into engagement with contact 43 whereby to cause shifting of contact arms 46 in a direction to cause reversed rotation of motor 16 whereby to move stop 20 to its operative position, thereby causing retractile movement of accelerator pedal 12, as in the case of Fig. 1, and slowing down the automobile. The remainder of the system is identical to that illustrated in the modification of Fig. 1.

Obviously many modifications of the present invention are possible in the light of the above teachings. It is therefore to be understood that within the scope of the appended claims the invention may be practiced otherwise than as specifically described.

What is claimed is:

1. In an automotive vehicle including a carburetor, an accelerator pedal, and a link connecting said carburetor and accelerator pedal whereby the speed of the vehicle may be controlled, the improvements comprising an abutment secured to said link, a stop slidably mounted on said link, a pivoted arm, a spring loaded member connecting said stop and arm, a motor for rotating said arm, means for effecting reversed rotation of said motor, and means responsive to the linear speed of the automobile for actuating said first mentioned means in a manner to cause movement of said stop into engagement with said abutment upon the vehicle exceeding a preselected maximum speed, whereby to move said link and accelerator pedal in a direction to cause slowing down of the vehicle, and to cause movement of said stop out of engagement with said abutment upon the vehicle slowing down below the preselected maximum speed, said spring loaded link permitting speeds in excess of the preselected maximum speed by additional pressure on the accelerator pedal.

2. The arrangement according to claim 1 wherein said spring loaded member comprises a telescoping link member having one end fixed to said stop, and a spring for normally retaining said link member in its expanded condition.

References Cited in the file of this patent

UNITED STATES PATENTS

| | | |
|---|---|---|
| 942,497 | Harris | Dec. 7, 1909 |
| 1,368,282 | Muzzy | Feb. 15, 1921 |
| 1,418,131 | Curtiss | May 30, 1922 |
| 1,566,376 | Cooty | Dec. 22, 1925 |
| 2,178,986 | Caldwell | Nov. 7, 1939 |
| 2,186,620 | Aprea et al. | Jan. 9, 1940 |
| 2,239,328 | Kolb | Apr. 22, 1941 |
| 2,265,524 | Fruth | Dec. 9, 1941 |
| 2,661,071 | Hoener | Dec. 1, 1953 |

FOREIGN PATENTS

| | | |
|---|---|---|
| 494,174 | Great Britain | Oct. 21, 1938 |